US010327058B2

(12) United States Patent
Nho

(10) Patent No.: US 10,327,058 B2
(45) Date of Patent: Jun. 18, 2019

(54) HEADSET HAVING REMOTE CONTROL FOR MULTIMEDIA PLAYBACK DEVICE

(71) Applicant: Samsung Electronics Co., Ltd., Gyeonggi-do (KR)

(72) Inventor: Kyoung-Min Nho, Seoul (KR)

(73) Assignee: Samsung Electronics Co., Ltd (KR)

(*) Notice: Subject to any disclaimer, the term of this patent is extended or adjusted under 35 U.S.C. 154(b) by 1081 days.

(21) Appl. No.: 14/247,890

(22) Filed: Apr. 8, 2014

(65) Prior Publication Data

US 2014/0219468 A1 Aug. 7, 2014

Related U.S. Application Data

(63) Continuation of application No. 11/759,027, filed on Jun. 6, 2007, now Pat. No. 8,693,702.

(30) Foreign Application Priority Data

Aug. 7, 2006 (KR) ........................ 10-2006-0074206

(51) Int. Cl.

*H04R 1/10* (2006.01)
*H04M 1/60* (2006.01)
*H04M 1/725* (2006.01)

(52) U.S. Cl.

CPC ........ *H04R 1/1041* (2013.01); *H04M 1/6058* (2013.01); *H04M 1/72558* (2013.01)

(58) Field of Classification Search

CPC ............ H04M 1/6058; H04M 1/72558; H04R 1/1041

USPC ......... 381/74, 102, 104, 105, 123, 309, 367, 381/370, 384; 360/22, 137; 700/94; 439/668; 455/151.1, 575.2, 418, 419, 420

See application file for complete search history.

(56) References Cited

U.S. PATENT DOCUMENTS

| | | | |
|---|---|---|---|
| 5,420,739 A | 5/1995 | Yokozawa et al. | |
| 6,606,506 B1 | 8/2003 | Jones | |
| 6,970,752 B1 | 11/2005 | Lim et al. | |
| 7,810,750 B2 | 10/2010 | Abreu | |
| 2002/0001381 A1 | 1/2002 | Mori | |
| 2003/0153213 A1 | 8/2003 | Siddiqui et al. | |
| 2003/0223612 A1 | 12/2003 | Knorr et al. | |
| 2004/0037051 A1 | 2/2004 | Hagiwara et al. | |
| 2005/0201568 A1* | 9/2005 | Goyal ................. | H04M 1/6058 381/74 |

(Continued)

FOREIGN PATENT DOCUMENTS

| | | |
|---|---|---|
| KR | 1020010018184 | 3/2001 |
| KR | 20-0233075 | 5/2001 |

(Continued)

*Primary Examiner* — Vivian C Chin
*Assistant Examiner* — Friedrich W Fahnert
(74) *Attorney, Agent, or Firm* — The Farrell Law Firm, P.C.

(57) ABSTRACT

An apparatus and method are provided for providing voltage to be used to control a call and multimedia via an electronic device. The apparatus includes a connector to be biased at a first voltage supplied from an electronic device external to the apparatus; and at least one voltage divider to divide the first voltage into a second voltage based at least in part on a user input to the apparatus, the second voltage to be used to control a call and multimedia via the electronic device.

22 Claims, 2 Drawing Sheets

(56) References Cited

U.S. PATENT DOCUMENTS

| | | | | |
|---|---|---|---|---|
| 2007/0133829 | A1* | 6/2007 | Kanji | H01R 29/00 381/123 |
| 2007/0178947 | A1 | 8/2007 | Kim | |
| 2008/0167092 | A1* | 7/2008 | Ueda | H04M 1/6066 455/575.2 |
| 2010/0029344 | A1* | 2/2010 | Enjalbert | H04M 1/6058 455/569.1 |

FOREIGN PATENT DOCUMENTS

| | | |
|---|---|---|
| KR | 1020060007281 | 1/2006 |
| KR | 20-0422375 | 7/2006 |

* cited by examiner

HEADSET HAVING REMOTE CONTROL FOR MULTIMEDIA PLAYBACK DEVICE

PRIORITY

This application is a Continuation of U.S. application Ser. No. 11/759,027, which was filed in the U.S. Patent and Trademark Office on Jun. 6, 2007, and claims priority under 35 U.S.C. § 119 to Korean Application Serial No. 10-2006-0074206, which was filed in the Korean Intellectual Property Office on Aug. 7, 2006, the content of each of which is incorporated herein by reference.

BACKGROUND OF THE INVENTION

1. Field of the Invention

The present invention relates generally to an apparatus, e.g., a headset, having a remote control for an electronic device, e.g., a multimedia playback device.

2. Description of the Related Art

Recently, multimedia playback devices have become widespread and currently even mobile phones are integrated with audio and video file playback functions.

Motion Picture Experts Group-1 Audio Layer 3 (MP3) is one of the most popular audio file formats, and an MP3 file playback function is no longer a special option for the mobile phone.

In order to listen to music in a public place, an MP3-enabled mobile phone may be used with a headset or an earphone.

FIG. 1 is a drawing illustrating a standard 4-conductor jack plug of a conventional headset designed for two stereo speaker channels, a microphone channel, and a common channel. The 4-conductor jack plug consists of a tip conductor 11 for a left channel, a first ring conductor 13 for a right speaker channel, a second ring conductor 15 for the microphone channel, and a sleeve conductor 17 for a ground.

FIG. 2 is a circuit diagram of a headset implemented with the 4-conductor jack plug of FIG. 1.

As shown in FIG. 2, a tip, first and second conductors 11, 13, and 15 are connected to a left earpiece 23, a right earpiece 25, and a microphone 21, respectively.

When listening to music using an MP3-enabled mobile phone with the above-structured conventional headset, a user must pick out the MP3-enabled mobile phone for manipulating playback operation using one of a keypad and a touchpad. However, such a behavior for manipulating the MP3-enabled mobile phone may divert the attention of the user from an ongoing activity and may potentially create a dangerous situation.

SUMMARY OF THE INVENTION

The present invention has been made in an effort to solve the above problems, and it is an object of the present invention to provide a headset having a remote control for an MP3-enabled mobile phone.

In accordance with an aspect of the present invention, an apparatus is provided, which includes a connector to be biased at a first voltage supplied from an electronic device external to the apparatus; and at least one voltage divider to divide the first voltage into a second voltage based at least in part on a user input to the apparatus, the second voltage to be used to control a call and multimedia via the electronic device.

In accordance with another aspect of the present invention, a method is provided, which includes supplying, by a first device, a first voltage to a second device; detecting, by the first device, a second voltage received from the second device, the second voltage to be generated at the second device based on the first voltage; and performing, by the first device, at least one function from a plurality of functions in relation with a call or multimedia, based at least in part on the second voltage.

In accordance with another aspect of the present invention, a non-transitory machine-readable storage device is provided for storing instructions that, when executed by one or more processors, cause the one or more processors to perform operations including supplying, by a first device, a first voltage to a second device; detecting, by the first device, a second voltage received from the second device, the second voltage to be generated at the second device based on the first voltage; and performing, by the first device, at least one function from a plurality of functions in relation with a call or multimedia, based at least in part on the second voltage.

BRIEF DESCRIPTION OF THE DRAWINGS

The above and other aspects, features and advantages of certain embodiments of the present invention will be more apparent from the following detailed description in conjunction with the accompanying drawings, in which.

DETAILED DESCRIPTION OF PREFERRED EMBODIMENTS

Various embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and described herein in detail, with the understanding that the present disclosure is to be considered as an exemplification of the principles of the invention and is not intended to limit the invention to the specific embodiments illustrated.

For example, the present invention is described with an MP3-enabled mobile phone. However, the headset of the present invention is not limited to usage with the MP3-enabled mobile phone and can otherwise be implemented to be used with various multimedia playback devices, including but are not limited to a Compact Disc (CD) player, a dedicated MP3 player, a MiniDisc (MD) player, a Portable Media Player (PMP).

Figure 1:
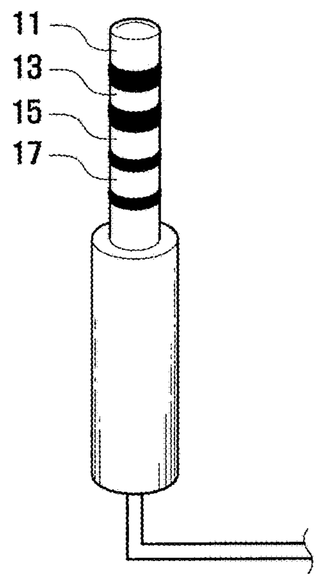
FIG. 1 is a drawing illustrating a jack plug of a conventional headset.
Figure 2:
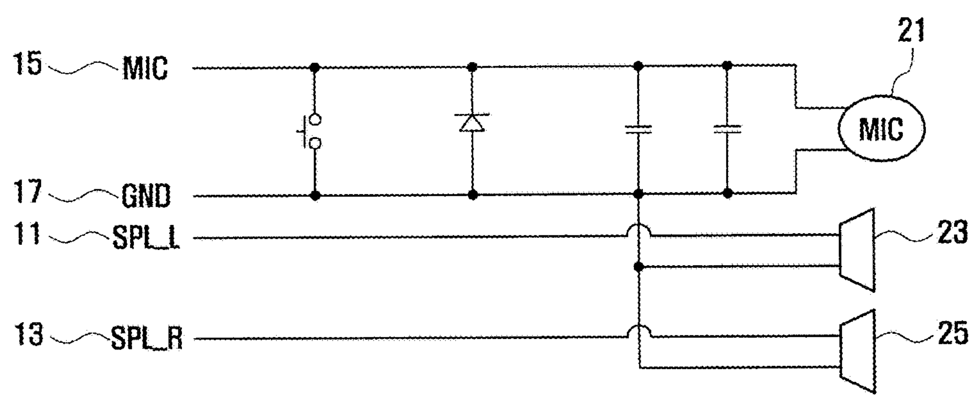
FIG. 2 is a circuit diagram of a headset implemented with the jack plug of FIG. 1.
Figure 3:
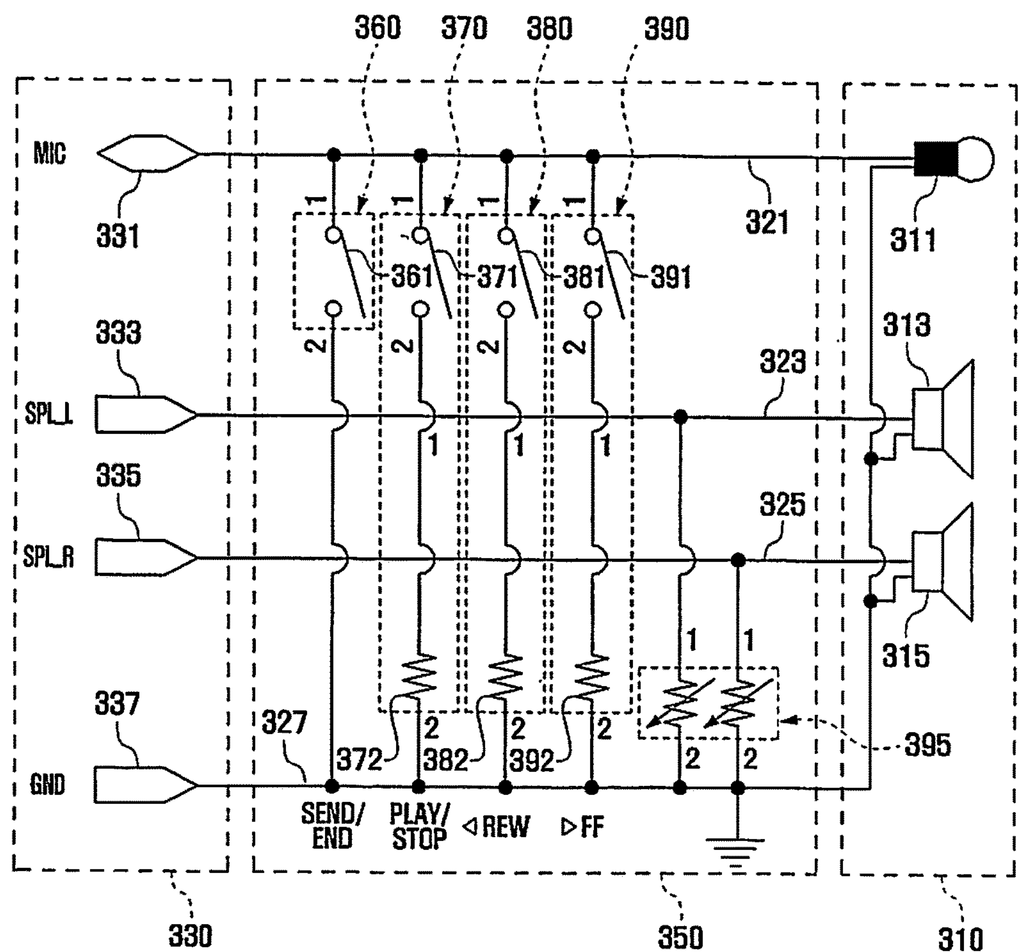
FIG. 3 is a circuit diagram of a headset according to the present invention.

FIG. 3 is a circuit diagram of a headset according to the present invention.

Referring to FIG. 3, the headset includes a body 310 having a microphone 311, left speaker 313 and right speaker 315; a jack plug 330 having a microphone electrode 331 coupled with the microphone 311 through a first signal link 321, a left channel electrode 333 coupled with the left speaker 313 through a second signal link 323, a right channel electrode 335 coupled with the right speaker 315 through a third signal link 325, and a ground electrode 337 grounded through a fourth signal link 327; and a remote control circuit 350 interposed between the body 310 and the jack plug 330.

The remote control circuit 350 includes first to fourth voltage dividers 360, 370, 380 and 390 interposed between the first and the fourth signal links 321 and 327 in parallel, and a volume controller 395 interposed between the fourth signal link 327 and the respective second and third links 323 and 325. The first voltage divider 360 includes a first switch 361. The second voltage divider 370 includes a second switch 371 and a first resistor coupled in series. The third voltage divider 380 includes a third switch 381 and a second resistor 382. The fourth voltage divider 390 includes a fourth switch 391 and a third resistor 392. The volume controller 395 includes an adjustable resistor.

The first to fourth switches 361, 371, 381, and 391 of the respective voltage dividers 360, 370, 380, and 390 are turned on and off according to a user's manipulation.

In a case where the headset is connected to a multimedia playback function-enabled mobile phone, a voltage value corresponding to a switch configuration is transferred to a Mobile Station Modem (MSM, not shown) of the mobile phone through a HKADC pin.

The MSM generates a code corresponding to the voltage value received from the remote control circuit 350 such that the mobile phone operates according to the code.

For example, a voltage value generated by the first voltage divider 360 is designated for a "send/end" key of a keypad of the mobile phone, a voltage value generated by the second voltage divider 370 is designated for a 'play/stop' key, a voltage value generated by the third voltage divider 380 is designated for a 'rewind' key, and a voltage value generated by the fourth voltage divider 390 is designated for 'fast forward' key. Accordingly, the headset also can control the audio playback function of the mobile phone by the keypad or touchpad.

Adjusting a resistance value of the adjustable resistor of the volume controller 395 can perform volume control.

In the present invention, the high voltage biased to the microphone link of the headset is divided by the voltage divider selected from the remote control circuit 350, and the voltage level generated by dividing the high voltage is provided to the MSM through the HKADC pin such that the MSM operates the audio playback function of the mobile phone.

As described above, a headset of the present invention is implemented with a remote control circuit on a signal link connecting the headset and a mobile phone, thereby improving a portability of the mobile phone and user convenience in controlling the audio playback related function of the mobile phone.

Although certain embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus comprising:

a connector to be biased at a first voltage supplied from an electronic device external to the apparatus; and at least one voltage divider to divide the first voltage into a second voltage based at least in part on a user input to the apparatus, the second voltage to be used to establish or end a call and control multimedia via the electronic device.

2. The apparatus of claim 1, further comprising a microphone to be activated based on the first voltage.

3. The apparatus of claim 1, wherein the at least one voltage divider comprises:

a first voltage divider to divide the first voltage into a first range to establish or end the call; and a second voltage divider to divide the first voltage into a second range to control the multimedia.

4. The apparatus of claim 1, further comprising a speaker to output an audio signal corresponding to content to be reproduced via the electronic device.

5. The apparatus of claim 1, further comprising:

a microphone;

a first speaker; and a second speaker, wherein the connector comprises:

a first electrode connected to the microphone via a first signal link;

a second electrode connected to the first speaker via a second signal link;

a third electrode connected to the second speaker via a third signal link; and a fourth electrode grounded via a fourth signal link.

6. The apparatus of claim 5, wherein the at least one voltage divider is connected in parallel in relation with the first signal link and the fourth signal link.

7. The apparatus of claim 5, further comprising a volume controller connected in relation with at least one of the second signal link, the third signal link, or the fourth signal link.

8. The apparatus of claim 1, wherein the at least one voltage divider comprises at least one of a resistor or a switch.

9. The apparatus of claim 1, wherein the apparatus comprises a headset or an earphone attachable to and detachable from the electronic device.

10. An apparatus comprising:

a connector to be connected with an electronic device external to the apparatus; and a controller operatively coupled with the connector, the controller configured to:

supply a first voltage to the electronic device; and establish or end a call and control a multimedia at the apparatus based at least in part on a second voltage received from the electronic device, the second voltage to be generated at the electronic device, based on the first voltage, according to a user input to the electronic device.

11. The apparatus of claim 10, wherein the controller is further configured to detect the second voltage based at least in part on the user input.

12. The apparatus of claim 10, wherein the controller is further configured to:

establish or end the call based at least in part on the second voltage falling into a first range; and control the multimedia based at least in part on the second voltage falling into a second range.

13. The apparatus of claim 10, wherein the controller is further configured to control the call in response to a call event occurring while content of the multimedia is reproduced.

14. The apparatus of claim 10, wherein the controller is further configured to control play, pause, stop, volume-up, volume-down, fast forward, or rewind of content to be reproduced via the apparatus.

15. The apparatus of claim 10, wherein the controller is further configured to supply the first voltage to activate a microphone operatively coupled with the electronic device.

16. A method comprising:

supplying, by a first device, a first voltage to a second device;

detecting, by the first device, a second voltage received from the second device, the second voltage to be generated at the second device based on the first voltage; and performing, by the first device, at least one function from a plurality of functions in relation with a call or multimedia, based at least in part on the second voltage, wherein performing the at least one function comprises establishing a connection for the call or releasing the connection.

17. The method of claim 16, further comprising:

detecting the second voltage based at least in part on a user input in relation with the second device.

18. The method of claim 16, wherein performing the at least one function further comprises:

performing a function in relation with the call, based at least in part on a determination that the second voltage falls into a specified range.

19. The method of claim 16, wherein performing the at least one function further comprises:

performing a function in relation with the multimedia, based at least in part on a determination that the second voltage falls into a specified range.

20. The method of claim 16, wherein performing the at least one function further comprises controlling at least one of a play function, a pause function, a stop function, a volume-up function, a volume-down function, a fast forward function, or a rewind function in relation with content to be reproduced via the first device.

21. The method of claim 16, wherein the first voltage is to be biased to a microphone operatively coupled with the first device.

22. A non-transitory machine-readable storage device storing instructions that, when executed by one or more processors, cause the one or more processors to perform operations comprising:

supplying, by a first device, a first voltage to a second device;

detecting, by the first device, a second voltage received from the second device, the second voltage to be generated at the second device based on the first voltage; and performing, by the first device, at least one function from a plurality of functions in relation with a call or multimedia, based at least in part on the second voltage, wherein performing the at least one function comprises establishing a connection for the call or releasing the connection.

* * * * *